Jan. 20, 1970   B. L. GODBERSEN   3,490,544
HARROW ATTACHMENT BREAKAWAY CONNECTION WITH OVERHEAD POSITION
Filed Nov. 23, 1966                            3 Sheets-Sheet 1

INVENTOR
BYRON L. GODBERSEN
BY
ATTORNEY

Jan. 20, 1970  B. L. GODBERSEN  3,490,544
HARROW ATTACHMENT BREAKAWAY CONNECTION WITH OVERHEAD POSITION
Filed Nov. 23, 1966  3 Sheets-Sheet 2
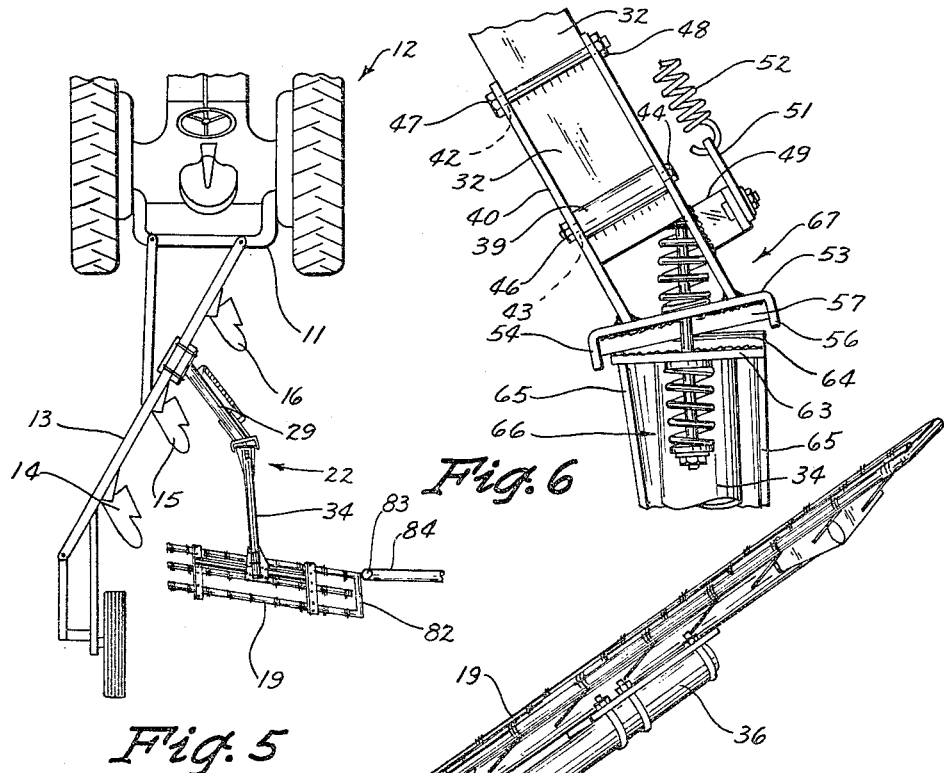
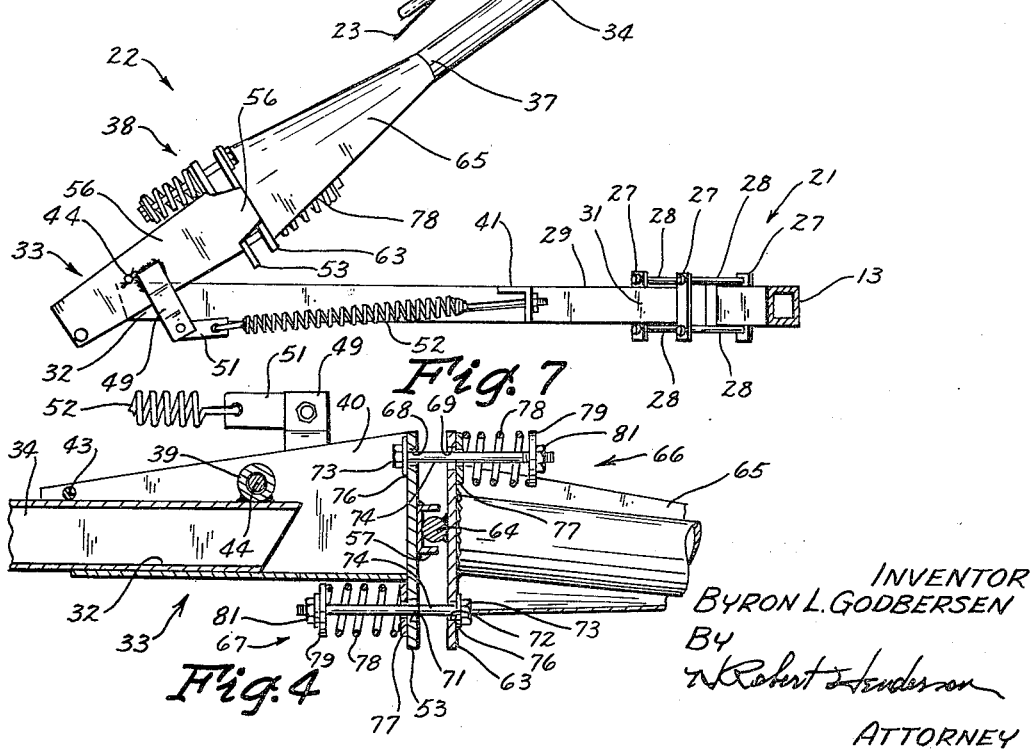
INVENTOR
BYRON L. GODBERSEN
BY
N. Robert Henderson
ATTORNEY

United States Patent Office 3,490,544
Patented Jan. 20, 1970

3,490,544
HARROW ATTACHMENT BREAKAWAY CONNECTION WITH OVERHEAD POSITION
Byron L. Godbersen, Ida Grove, Iowa 51445
Filed Nov. 23, 1966, Ser. No. 596,550
Int. Cl. A01b 19/10
U.S. Cl. 172—705
9 Claims

ABSTRACT OF THE DISCLOSURE

This invention relates to a structure for attaching a harrow to a plow frame wherein the attachment permits the harrow to be used first in a conventional ground engaging position, and secondly to be raised to a position wherein the harrow is folded over a portion of the attachment in a transport position, which transport position reduces the width of the harrow relative to the plow from that width which it had in the ground engaging position.

---

This invention relates generally to implement attachments and specifically to harrow attachments for a plow frame.

A disadvantage of one or more contemporary harrow attachments for a plow frame is the tendency of the harrow section to tilt with the plow frame. Thus, should the plow frame tilt to either side for any reason, for example one tire riding over a high spot, unequal tire pressures or compressions, the harrow section will tilt accordingly and in direct ratio to the tilt of the plow frame. This results in an uneven tilling of the soil. When the plow is being pulled over a side hill, for example, the tire on the downhill side is under more compression than the high side tire, and as there is a tendency of the plow frame to tilt accordingly, the harrow section will tilt also such as to drag the downhill side thereof deeper into the soil than the uphill side.

Another common disadvantage of the contemporary plow mounted harrow is that it can not be lifted and folded from its ground engaging position so as to reduce the overall width of the plow frame for transportation purposes. Thus, even though the harrow section can be lifted for transportation purposes, it still extends awkwardly to one side of the plow frame increasing the effective width of the plow frame and thus decreasing the maneuverability of the combined units.

Still another disadvantage of the plow mounted harrow is its susceptibleness to catching on a fence post or other obstructions when transporting the harrow from field to field. Another disadvantage is the stationary, non-give connection of the harrow to the plow beam. To overcome such disadvantages as these, and to provide other features described hereinafter, the present invention is directed.

It is an object of this invention to provide an improved harrow attachment.

Another object of this invention is the provision of a harrow attachment for a plow frame wherein the amount of tilt of the harrow section of the attachment is in considerably reduced ratio, compared to direct ratio, to the amount of tilt of the plow frame.

Still another object of this invention is the provision of a harrow attachment for a plow frame wherein the harrow section of the attachment tends, instead of to tilt, to turn about a vertical axis and to turn in a horizontal plane parallel to the surface of the ground over which it is being pulled, in response to a tilting of the plow frame about a substantially horizontal axis.

Another object of this invention is the provision of a harrow attachment for a plow frame wherein the harrow can be swung from an operative position in engagement with the ground, to a transport position supported above the plow frame, wherein the harrow attachment lies completely within the side or width confines of the plow frame, and in no way increases the width of the plow frame.

Yet another object of this invention is to provide a harrow attachment for a plow frame wherein the harrow can be swung from an operative position in engagement with the ground, to a transport position supported above the plow frame, and wherein the longitudinal axis of the harrow section of the attachment lies substantially parallel to the longitudinal axis of the plow frame beam.

A further object of this invention is to provide a harrow attachment having a split shaft, however, whereby lateral movement of one portion of the shaft is substantially prevented relative to the other portion.

A still further object of this invention is the provision of a harrow attachment for a plow frame having a split shaft pivotally connected together which utilizes a spring for biasing movement of the harrow into and out of a pivoted position swung completely over the plowshare beam, thus aiding greatly the transport maneuverability of the prime mover, plow frame, and attached harrow as a unit.

It is another object of this invention to provide a novel apparatus for flexibly and resiliently attaching a harrow to a plow.

It is yet another object of this invention to provide a connection apparatus for a harrow attachment whereby the harrow will break away and swing away from an obstacle upon which it has caught during movement of the plow.

Still another object of this invention is the provision of a connection apparatus for a harrow attachment which acts as a shock absorber when the harrow is in actual use.

Yet another object is an apparatus for flexibly connecting a pair of separated shafts and resiliently maintaining the shafts in substantially longitudinal alignment while permitting them relative movement.

These objects, and other features and advantages of this invention will become more readily apparent upon reference to the following description when taken in conjunction with the accompanying drawings, wherein:

FIG. 4 is a sectional view as taken along the line 4—4 in FIG. 3;

FIG. 5 is a reduced plan view similar to FIG. 2, and wherein the harrow has broken away from the fence post, due to the resilient connection;

FIG. 6 is an enlarged plan view similar to FIG. 3, and showing the resilient connection according to the FIG. 5 relation of parts;

FIG. 7 is a side elevational view showing the harrow in transport position; and

Figure 1:
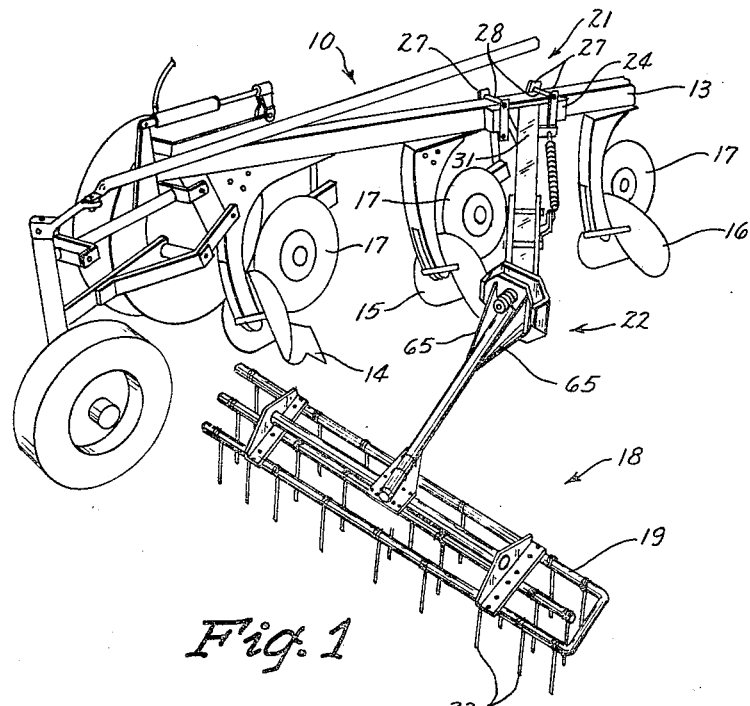
FIG. 1 is a perspective view of the harrow attachment of this invention, shown connected to a plow beam.

Referring now to the drawings and particularly to FIG. 1, a trailing-type moldboard plow is indicated generally at 10 connected to the draw bar 11 (FIG. 2) of a tractor 12. The plow is a three bottom plow having a beam 13 (FIG. 1) provided with the bottoms 14, 15, and 16, and the beam 13 also having three rolling coulters 17 mounted thereon.

Figures 2, 3:
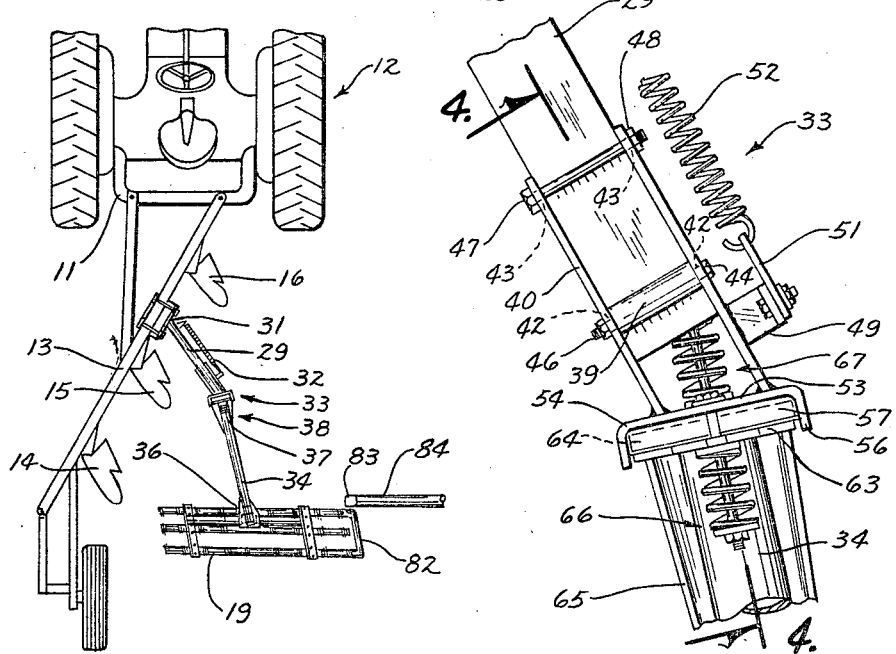
FIG. 2 is a reduced plan view showing the harrow caught on a fence post.
FIG. 3 is an enlarged plan view of the resilient connection of this invention, shown in the position of FIG. 2.

The harrow attachment of this invention is indicated generally at 18 in FIGS. 1 and 2, and comprises basically the harrow 19, a mounting bracket 21, and a shaft unit 22 for resiliently connecting the harrow 19 to the bracket 21.

In this instance the harrow 19 is a spring tooth type harrow wherein the spring teeth, indicated at 23 in FIG. 1, are pivotally mounted for yieldable engagement with the soil. The invention is not, however, limited to a particular harrow, nor is it limited to use with a particular plow 10.

The mounting bracket 21 (FIGS. 1 and 7) includes a beam 24 to which one end of the shaft unit 22 is connected. The beam 24 is shown held against a side of the plow beam 13 by a quartet of bars 27, two of which are against the exposed side of the beam 24 and the other two of which are held against the opposite side of the plow beam 13. The bars 27 are interconnected over and under the beams 13 and 24 by a quartet of connecting bolts 28. Again the invention of the resilient shaft unit 22 is not limited to a particular mounting bracket 21.

The shaft unit 22 comprises an elongated shaft 29 (FIG. 7) adapted to be connected at one end 31 thereof to the mounting bracket 21 and having a rearwardly extending free end 32, a linkage unit 33 pivotally mounted on the free end 32, a boom 34 connected on one end 36 to the harrow 19 and having the other end 37 extending forwardly therefrom, and a resilient connection 38 interconnected between the linkage unit 33 and the other end 37 of the boom 34 and biasing the linkage unit 33 and the boom 34 together so as to form and maintain them in a normal condition as part of an integral shaft unit 22.

As shown in FIGS. 2 and 7, the shaft 29, rectangular in cross section, is connected to the beam 24, as by welding, at an angle of approximately 45° to the longitudinal axis of the beam. A horizontally disposed hollow rod 39 (FIG. 4) is secured, as by welding, on the top of and near the free end 32 of the shaft 29, and extends at right angles to the longitudinal axis of the shaft 29. An angle bracket 41 is mounted to the side of the shaft 29, intermediate the ends thereof, as shown in FIG. 7, for a purpose hereinafter described.

The linkage unit 33, includes a substantially U-shaped element 40, as best shown in FIGS. 3 and 4, having a pair of horizontally disposed holes 42 and 43 drilled through both walls, at right angles to the longitudinal axis of the unit 33. The first hole 42 is disposed intermediate the ends of the element 40 and in axial alignment with the rod 39, while the second hole 43 is disposed on the outer end of the element 40 above the shaft 29, as viewed in side elevation in FIG. 4. A bolt 44 is seated in the first hole 42 and a rod 39 (FIG. 6) and secured thereto by a nut 46. A second bolt 47 and a nut 48 are detachably secured in the second hole 43.

Intermediate the ends of the element 40 and extending at right angles to the longitudinal axis thereof, is mounted an arm 49 (FIG. 7) having a free end projecting outwardly from the element 40. A link 51 is pivotally mounted on the free end of the arm 49. Interconnecting the link 51 and the angle bracket 41 on the shaft 29 is a helper spring 52.

Figure 8:
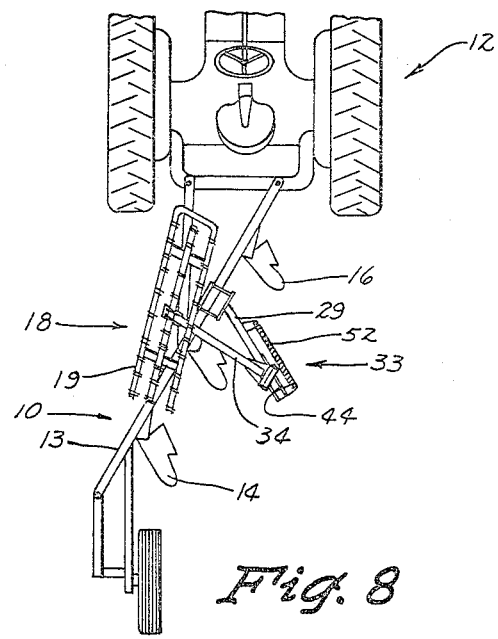
FIG. 8 is a reduced plan view similar to FIGS. 2 and 5, and showing the relationship of the harrow section to the plow frame when the former has been folded over and disposed above the plow frame.

To transport the harrow to the field along the narrow roads and lanes and through narrow gates, the second bolt 47 and nut 48 are removed and the harrow 19 is pivoted about the first bolt 44, aided by the helper spring 52, to a position wherein the boom 34 is disposed at an acute angle relative to the shaft 29, as viewed in FIGS. 7 and 8. The longitudinal axis of the harrow 19 in a transport position lies, in plan view, in a plane substantially parallel to the longitudinal axis of the plow beam 13. It can readily be seen from FIG. 8 that when folded over the plow frame beam 13, the entire harrow 19 lies completely within the sides or the width of the plow 10. Thus, when being transported, the harrow 19 in no way increases the maneuverability problems of the plow 10. The spring 52, in an extended position when the harrow engages the ground, normally biases the boom to a transport position, thus facilitating the lifting of the harrow.

To return the harrow 19 to its ground engaging position, the boom 34 is pivoted, again aided by the helper spring 52, to a position as shown in FIG. 4 and the second bolt 47 is inserted in the hole 43 and secured therein by threadably locking the nut 48 on the bolt 47. It will be noted in FIG. 4 that the boom 34 is supported by the element 40.

Mounted on the other end of the element 40 is a plate 53 (FIG. 3 and 4), the face of which extends at approximately 45° to the longitudinal axis of the element. A pair of parallel flanges 54 and 56 (FIGS. 3 and 7), integral with the plate, extend axially relative to the element. Secured to the face of the plate 53, as by welding, and extending between the flanges 54 and 56 is a horizontally disposed U-shaped channel 57 (FIGS. 3 and 4) with the open side thereof facing outwardly of the plate.

A second plate 63 (FIG. 3), adapted to be positioned in juxtaposed relation to the plate 53, is secured, as by welding, to the other end 37 of the boom 34. The face of the second plate 63 extends laterally substantially at right angles to the longitudinal axis of the boom 34. It will be noted in FIG. 3 that the lateral dimension of the second plate 63 is smaller than the lateral dimension of the plate 53, thus allowing the second plate 63 to be positioned between the flanges 54 and 56. Mounted on the face of the second plate 63 is a horizontally disposed rod 64 (FIG. 4) which is in alignment with and adapted to be seated in the channel 57. The length of the rod 64 is approximately equal to the distance between the flanges 54 and 56, whereby lateral movement of the plate 53 relative to the second plate 63 is substantially prevented. A pair of concave elements 65 are secured to the plate 63 and the boom 34, as best shown in FIGS. 1 and 7, to provide rigidity to the plate 63.

As shown in FIGS. 3 and 4, a full line contact of the surface of the rod 64 and the inner surface of the channel 57 is maintained on a horizontal axis transversely across the plates 53 and 63. To maintain the contact between the rod 64 and the channel 57, the resilient connection 38 is provided.

The resilient connection 38 comprises a pair of resilient connectors 66 and 67 (FIG. 4). To provide for the connectors, each plate 53 and 63 has a pair of apertures 68 and 71, and 69 and 72 respectively, formed in vertically spaced relation near the top and bottom of each plate. Upon horizontal alignment of each pair of apertures 68 and 69, and 71 and 72 of the plates, a bolt 73 of each connector 66 and 67 can be passed therethrough. It will be noted in FIG. 4 that the diameter of the apertures is necessarily larger than the diameter of the bolts, and importantly the diameter of the apertures 69 and 72 of plate 63 are larger than the apertures 68 and 71 of plate 53. As each connector is identical, only one will be described.

Referring to FIG. 4 the stem 74 of the bolt 73 is inserted through a washer 76 and then through the aligned apertures. Embracing the stem 74 and held next to the adjacent plate 63 is a guide washer 77, then is placed a compression spring 78, another guide washer 79 facing the washer 77, and a locking nut 81. It can readily be seen that either or both connectors 66 and 67 are individually adjustable as regards the compression of the spring 78.

In use, referring to FIG. 2, an end closure unit 82 of the harrow 19 is shown hooking against a post 83 of a fence 84. Were the shaft unit 22 stationary and of a non break-away type, it can readily be seen that damage either to the harrow 19 or to the fence 84 would occur upon continued forward movement of the tractor 12. However, due to the shaft unit 22, the plate 59 rocking against the plate 63 (FIGS. 5 and 6), the boom 34 and the harrow 19 swing horizontally in a clockwise direction as viewed in FIG. 5.

Thus, the harrow 19 is permitted to break away from the plow beam 13 to swing past the fence post 83. When completely past the post, the compression of the springs 78 will then bias the plates 59 and 63 back into their original face-to-face relationship (FIGS. 2 and 3). It will be noted in FIG. 6 that if the diameters of the apertures and the bolts are close, the stems 74 of the bolts 73 will likely contact the walls of the apertures and cause a binding of the stems and unsatisfactory action of the connectors 66 and 67.

As important a use, the operator can quickly and easily make working pressure adjustments on the harrow 19. Thus, should it be desired to have the harrow raised slightly to lift the spring teeth 23 to a slightly higher position, the operator need merely tighten down the nut 81 for the upper connector 66 to increase the compression of the spring 78, while loosening the nut 81 for the lower connector 67 if necessary. This will pivot the plate 53 in a clockwise direction (FIG. 4) about the horizontal contact of the rod 64 with the channel 54 of the plate 63, thus raising the boom 34 more toward the horizontal. Conversely, a tightening of the lower connector unit nut 81 and, if necessary, a loosening of the upper connector unit 66 nut 81 (FIG. 4) would cause the harrow 19 to drop further down to increase the working pressure of the spring teeth 23.

Yet another advantage of the harrow attachment 18 of this invention, which may well be its most important advantage, is its capability of retaining substantially a level position relative to the soil level, regardless of a slight tilt of the plow beam 13. This advantage is obtained by the shaft beam 29 (FIG. 2) extending away from the longitudinal axis of the plow beam at approximately a 67½° angle, and with a plane taken through the plates 53 and 63 intersecting the plow beam 13 at approximately at 45° angle therewith. It is noted furthermore that the shaft 29 and the boom 34 (FIG. 2) form an obtuse angle on their side closest the plow beam 13.

Thus, should the plow beam tilt slightly one way or another away from a horizontal plane, due for example to a slope of the ground surface, the attachment 18 reacts such that the end of the harrow 19 nearest the beam 13 does not change its height perceptibly, and with the opposite end changing its height above the ground surface approximately one-half the amount of tilt of the plow beam. Putting it another way, should the plow beam 13 tilt slightly one way or another due for any reason to either side of the tractor 12 raising or lowering, the attachment 18 reacts such that rather than tilting, the harrow 19 literally turns in a horizontal plane and about a vertical axis somewhat in the center thereof, such that it can be said that the slight tilting of the plow beam results in substantially a negative tilting of the harrow 19. It is believed that this reaction of the harrow 19 is due to the particular angular relationship of the attachment 18 to the plow 10, and to the resilient shaft unit 22.

Although a preferred embodiment of this invention has been disclosed and described herein, it is to be remembered that various modifications and alternate constructions can be made thereto without departing from the invention.

I claim:

1. A harrow attachment for a plow frame having a plow beam comprising in combination:

a harrow;

an elongated shaft adapted to be connected at one end thereof to the plow frame and having a rearwardly extended free end; and elongated boom means connected at a rear end to said harrow and pivotally connected at a front end to said shaft free end, said boom means supported by said free end in a first position wherein said harrow is ground engageable, and in a pivotally moved second position wherein said harrow and a portion of said boom means are disposed over the plow frame.

2. A harrow attachment as defined in claim 1, and further wherein the main plane of the shaft extends at an acute angle relative to the main plane of the plow beam.

3. A harrow attachment as defined in claim 2, and further wherein the main plane of said shaft intersects the main plane of said boom means at an obtuse angle taken about the sides of said shaft and said boom means closest to the plow beam.

4. A harrow attachment as defined in claim 3, and including further detachable locking means operable to lock said boom means and said shaft in said first position.

5. A harrow attachment as defined in claim 4, and further wherein said boom means includes resilient connector means pivotally connected to said shaft free end, and a boom connected at a rear end to said harrow and at a front end to said connector means, said connector means operable to resiliently maintain the position of said boom relative to said shaft.

6. A harrow attachment as defined in claim 5, and further wherein said connector means includes a first plate secured to said boom at one end thereof, and a second plate pivotally connected to said shaft free end, said plates maintained in a face-to-face relation; and resilient devices interconnecting said plates and biasing said plates toward each other, whereby to form and maintain said boom means as an integral second shaft.

7. A harrow attachment as defined in claim 6, and further wherein a plane taken through said first plate and said second plate intersects the longitudinal axis of the plow beam at approximately a 45° angle therewith.

8. A harrow attachment as defined in claim 7, and further wherein said plates each have a pair of vertically spaced apertures near the top and bottom thereof for receiving said elements, said apertures having a diameter greater than the diameter of said elements to obviate the binding of said elements in said apertures.

9. A harrow attachment as defined in claim 8, and further wherein said second plate has a pair of flanges integral therewith, said flanges disposed on opposite sides of said second plate and extended parallel to the longitudinal axis of said boom, said first plate cradled by said flanges, whereby lateral movement of said first plate relative to said second plate is substantially prevented.

References Cited

UNITED STATES PATENTS

| | | | |
|---|---|---|---|
| 267,247 | 11/1882 | Paullin | 172—202 |
| 336,023 | 2/1886 | Spencer | 172—202 |
| 1,039,152 | 9/1912 | Long | 172—482 |
| 1,317,169 | 9/1919 | Long | 172—482 |
| 1,846,005 | 2/1932 | Hoffman | 172—662 |
| 2,923,364 | 2/1960 | King et al. | 172—678 |
| 3,100,018 | 8/1963 | Sokolowski | 172—705 X |

ROBERT E. PULFREY, Primary Examiner

A. E. KOPECKI, Assistant Examiner

U.S. Cl. X.R.

172—202, 662